(12) United States Patent
Kauffman

(10) Patent No.: US 10,953,930 B2
(45) Date of Patent: Mar. 23, 2021

(54) DAMPER HOUSING ASSEMBLY

(71) Applicant: Honda Motor Co., Ltd., Tokyo (JP)

(72) Inventor: Jared S. Kauffman, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 16/364,784

(22) Filed: Mar. 26, 2019

(65) Prior Publication Data

US 2020/0307718 A1    Oct. 1, 2020

(51) Int. Cl.
| | |
|---|---|
| *B62D 21/11* | (2006.01) |
| *B62D 27/02* | (2006.01) |
| *F16B 5/02* | (2006.01) |
| *F16B 5/04* | (2006.01) |

(52) U.S. Cl.
CPC ............. *B62D 27/02* (2013.01); *F16B 5/02* (2013.01); *F16B 5/04* (2013.01)

(58) Field of Classification Search
CPC ....... B62D 25/08; B62D 25/088; B62D 21/11
See application file for complete search history.

(56) References Cited

U.S. PATENT DOCUMENTS

| | | | |
|---|---|---|---|
| 5,040,917 A * | 8/1991 | Camuffo | B62D 21/09 403/408.1 |
| 5,431,363 A | 7/1995 | Ezzat et al. | |
| 7,334,958 B2 * | 2/2008 | Muller | F16B 5/04 403/168 |
| 7,703,805 B2 | 4/2010 | Sasaki et al. | |
| 8,777,300 B2 | 7/2014 | Kim et al. | |
| 9,517,796 B2 | 12/2016 | Balzer et al. | |
| 9,616,937 B2 | 4/2017 | Sasaki | |
| 9,751,564 B2 | 9/2017 | Muehlhausen et al. | |
| 9,878,743 B2 | 1/2018 | Maruyama et al. | |
| 9,919,745 B2 | 3/2018 | Caillard et al. | |
| 2006/0103099 A1 * | 5/2006 | Zuber | B60G 7/02 280/124.1 |
| 2017/0174264 A1 | 6/2017 | Maruyama et al. | |
| 2018/0029643 A1 | 2/2018 | Maruyama et al. | |
| 2018/0154947 A1 * | 6/2018 | Stastny | B62D 25/20 |
| 2018/0180074 A1 * | 6/2018 | Benthaus | F16B 5/0657 |
| 2019/0023329 A1 * | 1/2019 | Koerner | B62D 21/09 |

FOREIGN PATENT DOCUMENTS

| | | |
|---|---|---|
| DE | 102005043948 A1 | 4/2007 |
| DE | 102005051215 A1 | 5/2007 |
| DE | 102010014508 A1 | 11/2010 |
| DE | 102011112056 A1 | 3/2012 |
| DE | 102013007349 A1 | 10/2014 |
| JP | 2017154514 A | 9/2017 |

* cited by examiner

*Primary Examiner* — James A English
(74) *Attorney, Agent, or Firm* — American Honda Motor Co., Inc.; William R. Fisher

(57) ABSTRACT

A damper housing assembly is provided that includes a damper housing, a body, and a first member. The damper housing comprises a first material and the body comprises a second material that is different than the first material. The first member includes a flange and a protrusion. The flange is secured to body, the body is positioned between the damper housing and the flange, and the protrusion extends from the flange and at least partially into the damper housing.

18 Claims, 14 Drawing Sheets

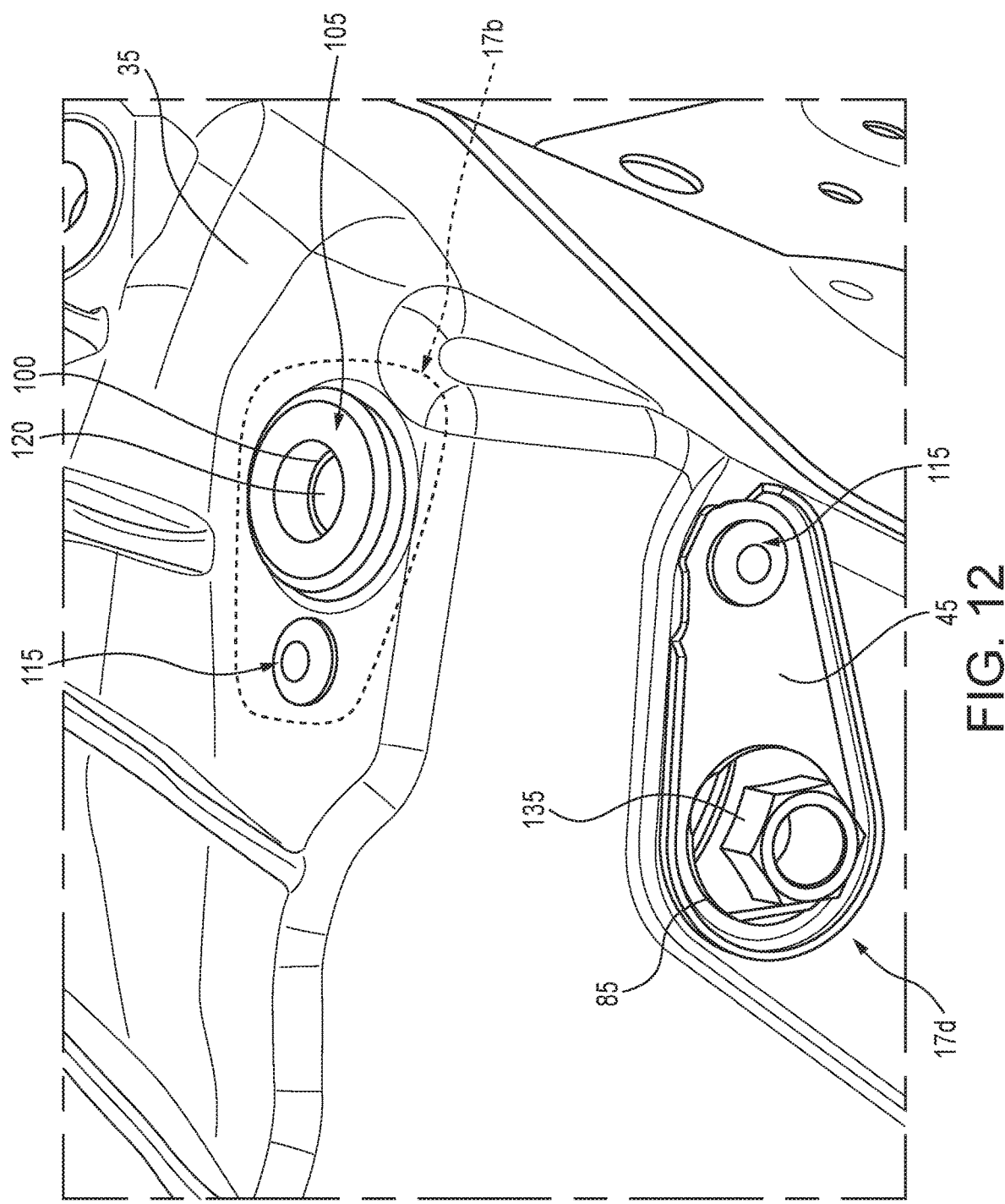

DAMPER HOUSING ASSEMBLY

BACKGROUND

The substitution of lightweight materials for steel used in motor vehicles is an attractive option for vehicle mass reduction. However, the remainder of the vehicle body structure may still be fabricated with a dissimilar material. The joining of dissimilar materials can be problematic and additional processes must be considered to assemble such materials and to inhibit galvanic corrosion.

SUMMARY

In accordance with one embodiment, a damper housing assembly is provided that includes a damper housing comprising a first material, a body comprising a second material that is different than the first material, and a first member including a flange and a protrusion. The flange is secured to the body, and the body is positioned between the damper housing and the flange. The protrusion extends from the flange and at least partially into the damper housing. A body component is securable to the first member.

In accordance with one embodiment, a damper housing assembly is provided that includes a damper housing, a body, a first member, and a body component. The damper housing comprises a first material and defines a first aperture. The body comprises a second material that is different than the first material. The body includes a first side and a second side and defines a first aperture extending from the first side to the second side. The second side of the body is positioned adjacent a surface of the damper housing with the first aperture of the body aligned with the first aperture of the damper housing. The first member includes a flange and a protrusion. The flange includes a first side and a second side, and the second side of the flange is secured to the first side of the body. The protrusion extends from the second side of the flange through the first aperture of the body and at least partially into the first aperture of the damper housing. The body component is secured to the first member.

In accordance with one embodiment, a damper housing assembly is provided that includes a damper housing, a body, a first member, and a fastener. The damper housing comprises a first material and defines a first aperture and a second aperture. The body comprises a second material that is different than the first material, and includes a first side and a second side. The body defines a first aperture extending from the first side to the second side and a second aperture extending from the first side to the second side. The second side of the body is positioned adjacent a surface of the damper housing with the first aperture of the body aligned with the first aperture of the damper housing and the second aperture of the body aligned with the second aperture of the damper housing. The first member includes a flange and a protrusion. The flange includes a first side and a second side. The second side of the flange is secured to the first side of the body, and the protrusion extends from the second side of the flange through the first aperture of the body and at least partially into the first aperture of the damper housing. A body component is securable to the first member. A fastener extends through the second aperture of the body and the second aperture of the damper housing to secure the body to the damper housing.

In accordance with an embodiment, a method of making a damper housing assembly is provided that includes positioning a joining assembly adjacent a surface of a damper housing, wherein the joining assembly includes a first member secured to a body, the first member includes a protrusion extending therefrom, the body defines a first aperture and a second aperture, and the damper housing defines a first aperture and a second aperture, inserting the protrusion of the first member at least partially into the first aperture of the damper housing, aligning the second aperture of the body with the second aperture of the damper housing, and fastening the body to the damper housing with a rivet extending through the second aperture of the housing and the second aperture of the body.

The body of the joining assembly may include a first side and a second side, and the body may be comprised of a steel. The second side of the body is positioned adjacent the surface of the damper housing. The first member of the joining assembly includes a flange and a collar, the flange includes a first side and a second side, the second side of the flange is welded to the first side of the body, the protrusion extends from the second side of the flange through the first aperture of the body, and the collar extends from the first side of the flange away from the protrusion. The first member defines a bore extending therethrough and the protrusion defines a first opening to the bore and the collar defines a second opening to the bore. The damper housing according to one embodiment is comprised of an aluminum alloy or magnesium alloy casting.

Optionally, the method may include a step of providing the joining assembly that comprises stamping a steel sheet to form the body, providing the first member that includes a plurality of projections extending from the second side of the flange that are positioned on the second side of the flange radially outward of the protrusion, inserting the protrusion of the first member through the first aperture of the body and positioning the projections against the first side of the body, projection welding the first member to the second side of the flange to the first side of the body to form the joining assembly, and coating the joining assembly before fastening the body of the joining assembly to the damper housing with the rivet.

Optionally, the method includes securing a body component to the first member with a fastener that extends into the bore through the first opening to secure the body component to the first member with the damper housing positioned between the body component and the body.

BRIEF DESCRIPTION OF THE DRAWINGS

FIG. 12 is an exterior view of a first joining assembly secured to an exterior of a damper housing and a second joining assembly secured to an interior of the damper housing according to one aspect of the present disclosure.

DETAILED DESCRIPTION

It should be understood that the description and drawings herein are merely illustrative and that various modifications and changes can be made in the compositions, methods and structures disclosed without departing from the present disclosure.

Figure 1:
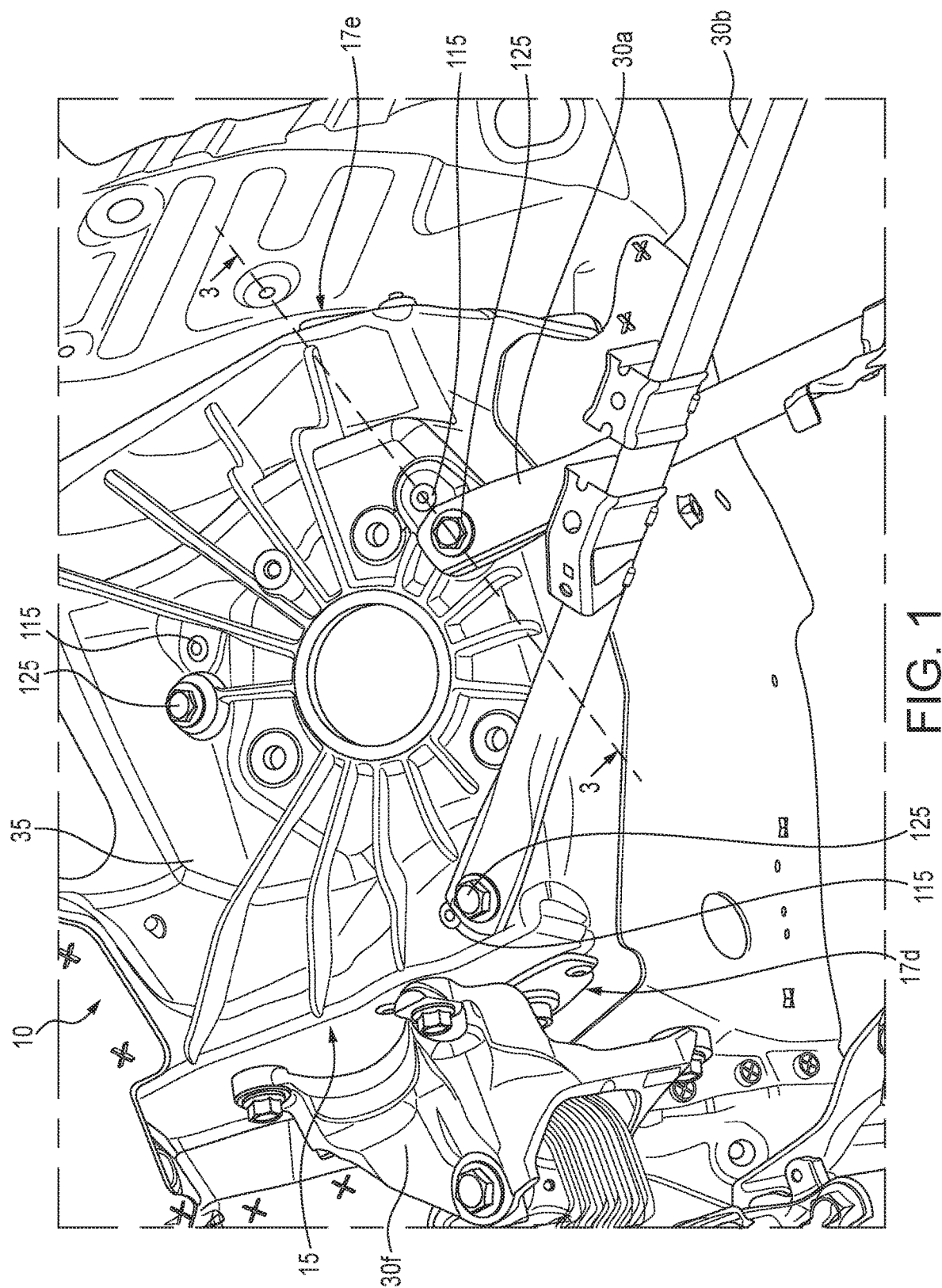
FIG. 1 illustrates an exterior view of a damper housing assembly according to one aspect of the present disclosure.
Figure 2:
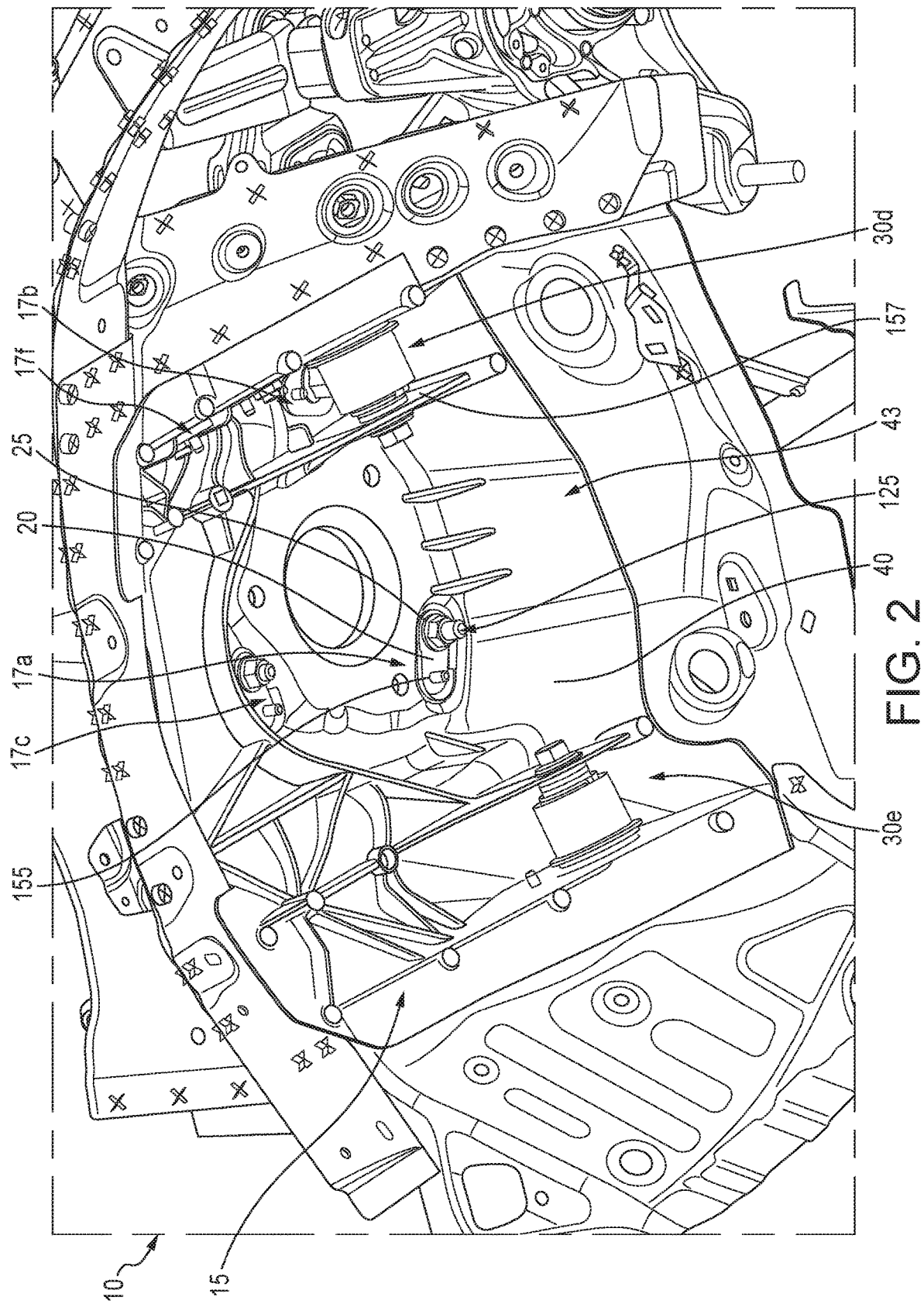
FIG. 2 illustrates an interior view of a damper housing assembly according to one aspect of the present disclosure.
Figure 3:
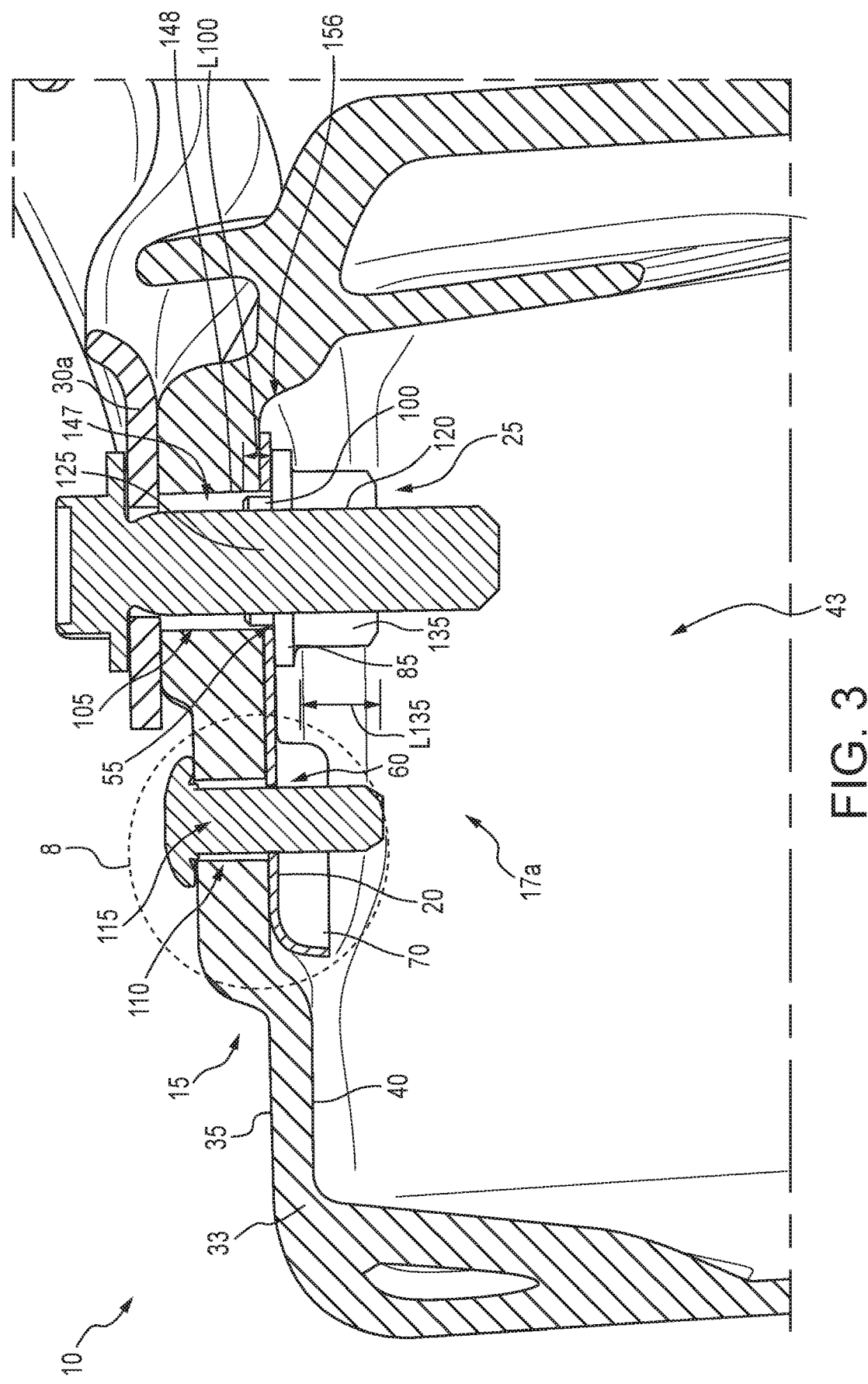
FIG. 3 is a cross-sectional view from line 3-3 in FIG. 1.

A multi-material damper housing assembly 10 and method of making the assembly is provided. In general, as shown in FIGS. 1, 2 and 3, the damper housing assembly 10 includes a damper housing 15, at least one joining assembly 17 that includes a body 20 and a first member 25, and optionally a body component 30 of a vehicle secured to the joining assembly 17. The damper housing 15 comprises a first material such as a metal or metal alloy, and the body 20 comprises a second material such as a metal or metal alloy that differs from the first material. As used herein, the body components 30a (a first strut bar), 30b (a second strut bar), 30d (a first bushing), 30e (a second bushing) and 30f (an engine mount) each refers to illustrative examples of the body component 30, and the joining assemblies 17a, 17b, 17c, 17d, 17e, and 17f each refers to illustrative examples of the joining assembly 17. Accordingly, the body component 30 may include suspension components including, but not limited to, the first bushing 30d and the second bushing 30e.

The damper housing 15 supports loads inputted from front body components 30. As best shown in FIG. 3, the damper housing 15 includes an outer wall 33 with an exterior surface 35 and an interior surface 40 for securing body components 30 thereto with the joining assembly 17. The interior surface 40 defines a chamber 43 for receiving the damper (not shown) and other body components 30 therein. The damper housing 15 may comprise a lightweight metal casting or metal alloy casting including, but not limited to, an aluminum alloy or a magnesium alloy.

Figure 4A:
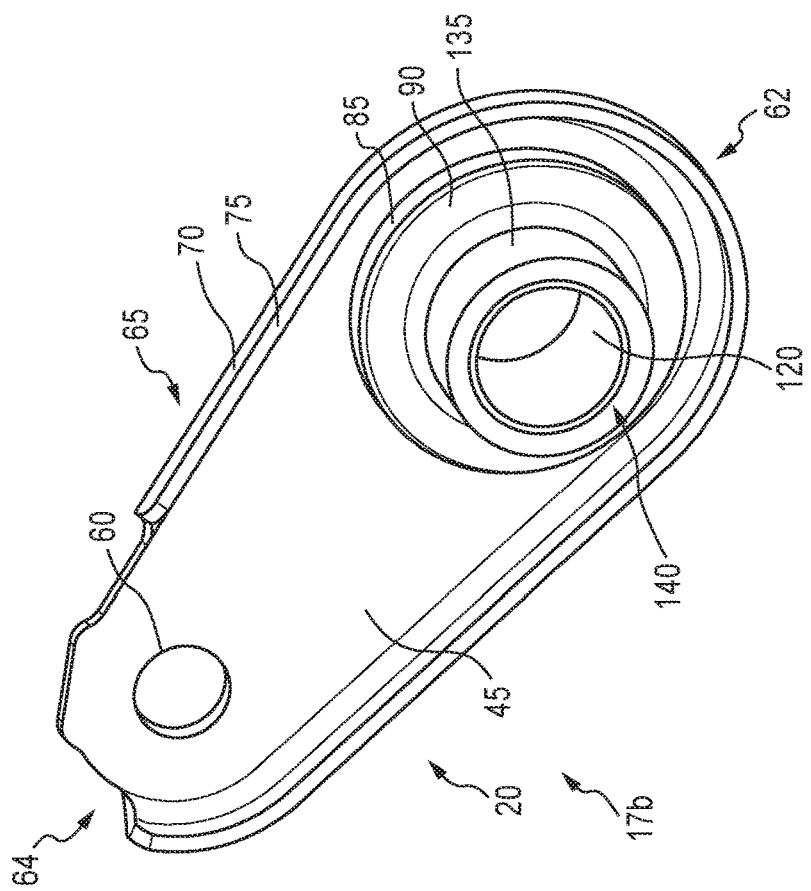
FIG. 4A is a perspective view of a first side of a joining assembly according to one aspect of the present disclosure.
Figure 4B:
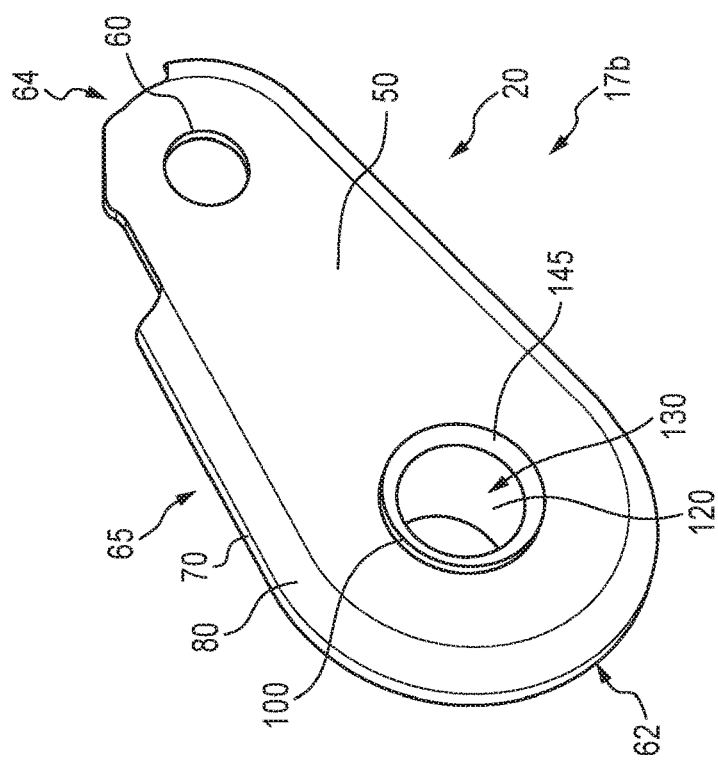
FIG. 4B is a perspective view of a second side of the joining assembly of FIG. 4A.
Figure 5A:
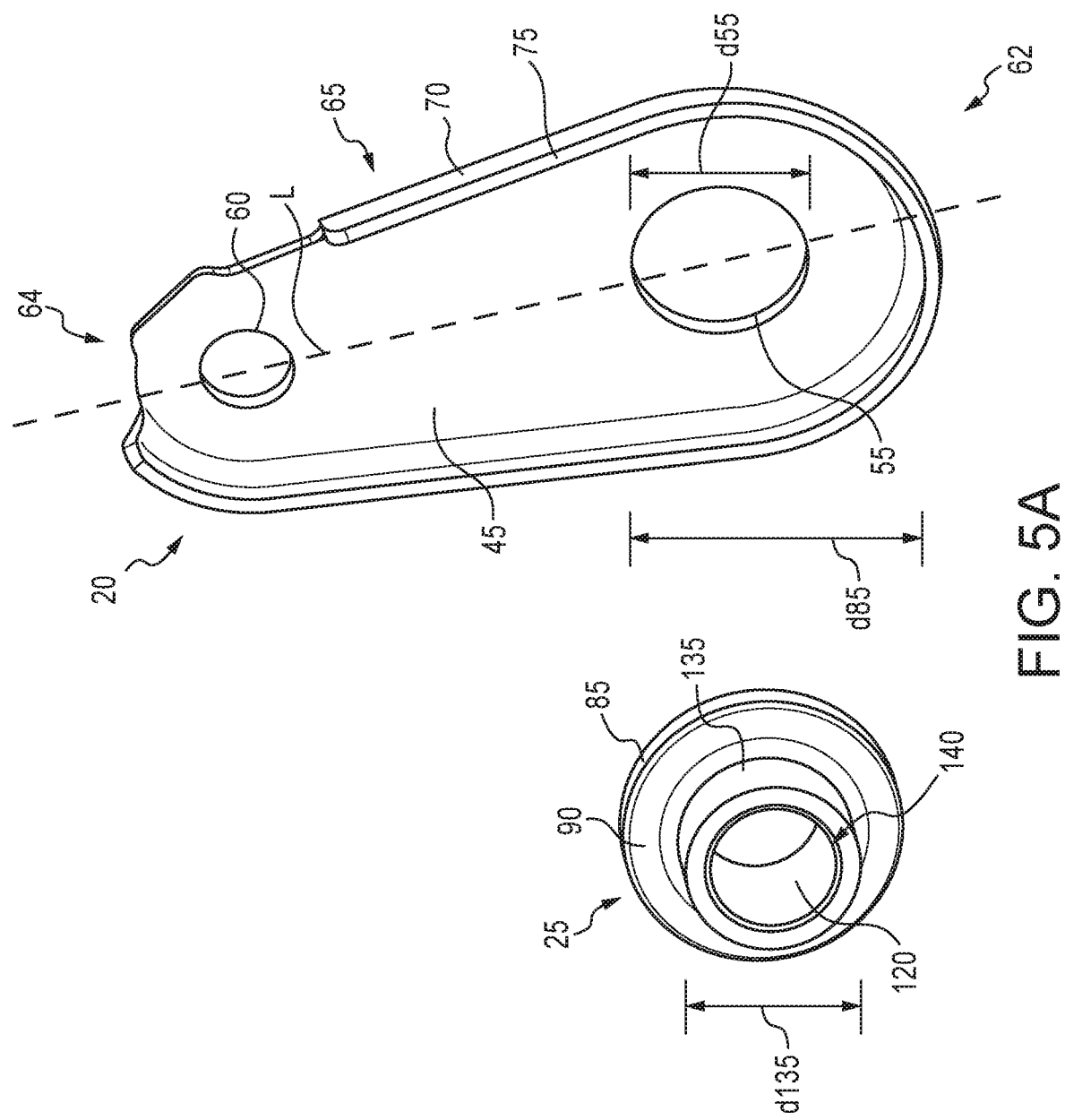
FIG. 5A is an exploded view of the joining assembly of FIG. 4A.
Figure 5B:
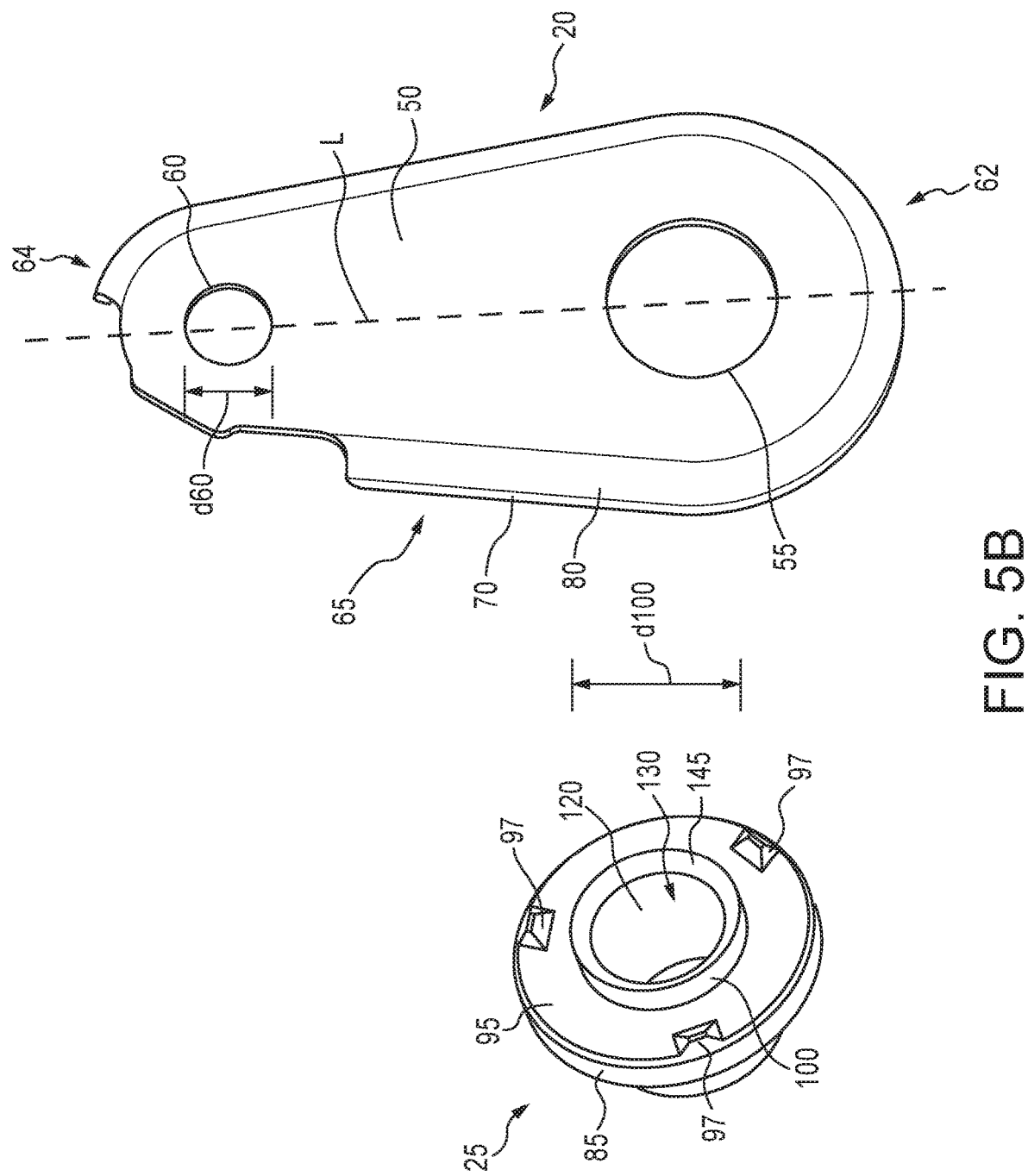
FIG. 5B is an exploded view of the joining assembly of FIG. 4B.

Damper housings comprised of a lightweight metal or metal alloy have different properties than conventional steel damper housings. The joining assembly 17 facilitates the alignment and fastening of the body component 30 to the lightweight material damper housing 15. Referring to the joining assembly 17b shown in FIGS. 4A, 4B, 5A, and 5B for illustrative purposes, the body 20 of the joining assembly 17b has a planar shape, is comprised of steel, and includes a first side 45 and a second side 50. As shown in FIGS. 5A and 5B, the body 20 defines a first aperture 55 that accommodates the alignment of the body component 30 with the damper housing 15, and a second aperture 60 that accommodates the fastening of the joining assembly 17 to the damper housing 15. The body 20 includes a first end 62 adjacent the first aperture 55 and a second end 64 adjacent the second aperture 60. As shown in FIGS. 5A and 5B, the width of the body 20, as measured by a line perpendicular to a centerline L of the body 20, may decrease between the first aperture 55 and the second aperture 60 as the centerline L extends from the first aperture 55 to the second aperture 60.

Illustrative examples of steel types suitable for forming the body 20 include, but are not limited to, cold-rolled steel, galvanized steel, and galvanneal steel. Although the body 20 is comprised of steel and the damper housing 15 is comprised of a lightweight material such as aluminum or an aluminum alloy, the body 20 may be provided with one or more features that inhibits galvanic corrosion. In a non-limiting example, the body 20 comprises a steel stamping that is coated after stamping with a material for electrically insulating the steel body 20 from the damper housing 15. For example, the stamped steel body 20 may be coated with an epoxy-based coating applied by an electrodeposition coating process, also known as e-coating. In another non-limiting example, at least a portion of the perimeter 65 of the body 20 is bent to define a lip 70 with a cut edge 75 extending outward from the first side 45 of the body 20 away from the adjacent surface of the damper housing 15. Therefore, the cut edge 75 of the lip 70 is positioned away from the damper housing 15 and a rounded edge 80 along the second side 50 of the body 20 is presented to the damper housing 15 during assembly to inhibit scratching of any protective coating on the damper housing 15. In a non-limiting example, at least 50% of the length of the perimeter 65 is bent to define the lip 70. In another non-limiting example, at least 75% of the length of the perimeter 65 is bent to define the lip 70.

Figure 6:
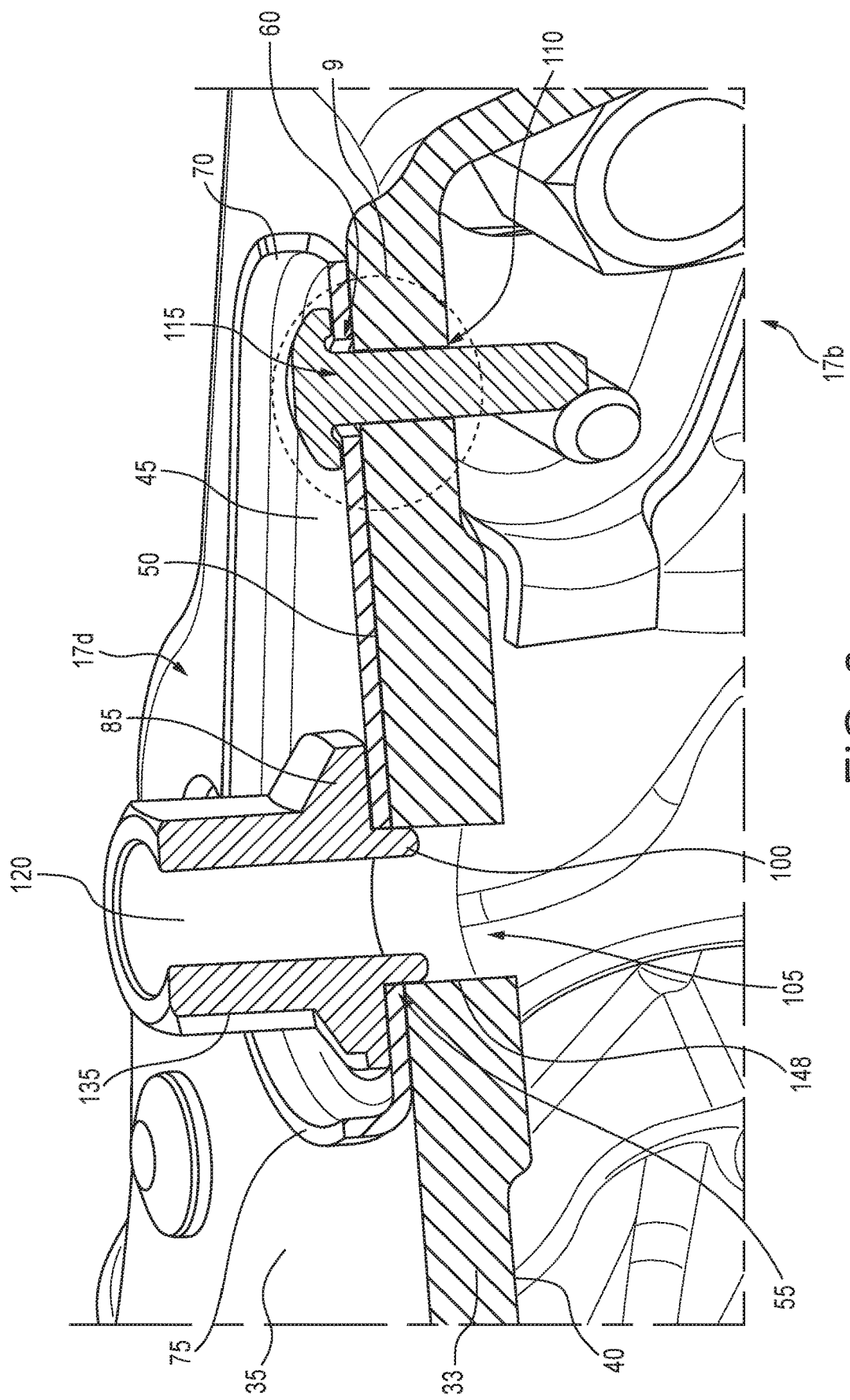
FIG. 6 is a cross-sectional view of a joining assembly secured to a damper housing according to one aspect of the present disclosure.

The first member 25 may be secured to the body 20 to align the body component 30 with the damper housing 15, and provide an attachment point on the joining assembly 17 for the body component 30. As shown in FIGS. 5A and 5B, the first member 25 includes a flange 85 having a first side 90 and a second side 95. The second side 95 of the flange 85 is secured to the first side 45 of the body 20, for example, by welding. In a non-limiting example, the flange 85 has a diameter d85 that is greater than the diameter d55 of the first aperture 55 of the body 20, and the second side 95 includes one or more projections 97 for projection welding the first member 25 to a portion of the first side 45 of the body 20 surrounding the first aperture 55. A protrusion 100 is positioned radially inward of the projections 97 and extends outward from the second side 95 of the flange 85 through the first aperture 55 and beyond the second side 50 of the body 20 as shown in FIG. 4B. In a non-limiting example as shown in FIG. 6, when the second side 50 of the body 20 is positioned adjacent the exterior surface 35 of the damper housing 15 with the first aperture 55 of the body 20 aligned with a first aperture 105 defined by the damper housing 15, the protrusion 100 can be inserted at least partially into the first aperture 105 of the damper housing 15. The second aperture 60 of the body 20 may then be aligned with a second aperture 110 defined by the damper housing 15, and a fastener 115 may be inserted through the second aperture 60 of the body 20 and the second aperture 110 of the damper housing 15 to secure the body 20 of the joining assembly 17 to the damper housing 15.

Figure 7:
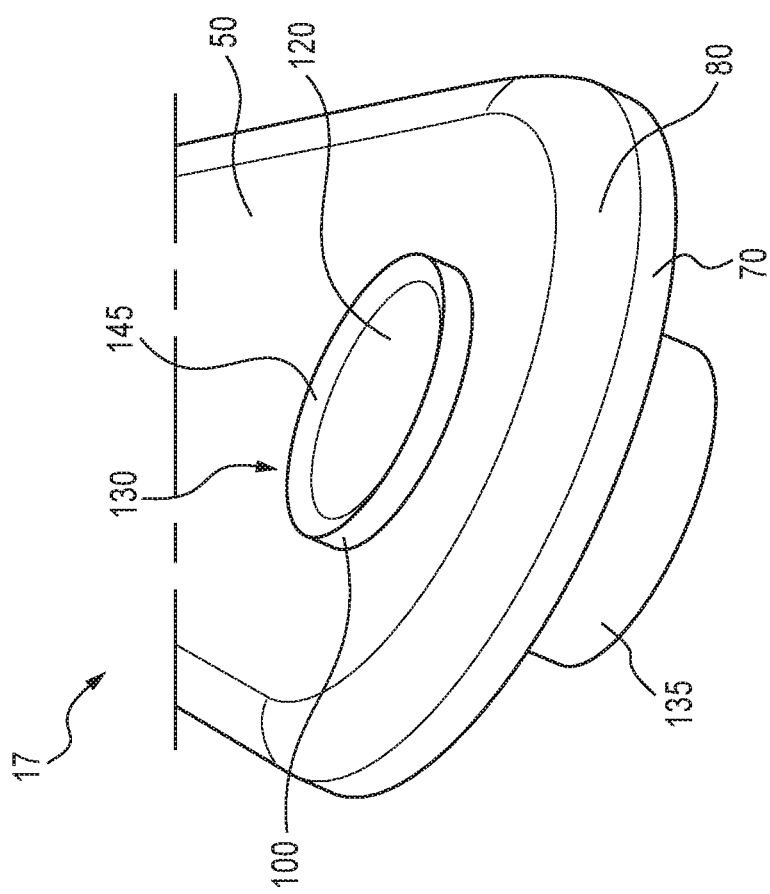
FIG. 7 is a partial view of a second side of a joining assembly according to one aspect of the present disclosure.

Insertion of the protrusion 100 in the damper housing 15 allows the body component 30 to be indirectly secured to the damper housing 15 in a manner that limits disturbance of any protective coating on the damper housing 15, such as an e-coating, by eliminating the need to machine threads directly in the damper housing 15. Referring to FIGS. 3, 5A and 5B, the first member 25 defines a bore 120 that is shaped to receive and engage a fastener 125 of a body component 30, such as a threaded steel bolt. The bore 120 extends through the first member 25 and the protrusion 100 defines a first opening 130 to the bore 120. As shown in FIG. 7, an end 145 of the bore 120 adjacent the first opening 130 of the protrusion 100 may be tapered to facilitate insertion of the fastener 125 into the bore 120 via the first opening 130. As shown in FIGS. 4A and 5A, the first member 25 may include a collar 135 that defines a second opening 140 to the bore 120. The collar 135 extends outward from the first side 90 of the flange 85 and away from the protrusion 100. In a non-limiting example as shown in FIG. 3, the collar 135 extends outward from the flange 85 a distance that is greater than the distance L100 the protrusion 100 extends outward from the flange 85 to increase the surface area in the bore 120 for engagement with the fastener 125. The exterior shape of the collar 135 is not limited. In a non-limiting example as shown in FIG. 4A, the exterior shape of the collar 135 may be smooth and rounded. In a non-limiting example as shown in FIG. 12, the exterior shape of the collar 135 may be shaped like a hex nut.

One or more of the flange 85, the protrusion 100, and the collar 135 may be cylindrically shaped. In a non-limiting example as shown in FIGS. 5A and 5B, the protrusion 100 and the collar 135 are each cylindrically shaped, and the collar 135 has an outer diameter d135 that is greater than the outer diameter d100 of the protrusion 100. In another non-limiting example, the protrusion 100, the collar 135, and the flange 85 are each cylindrically shaped, the outer diameter d85 of the flange 85 is greater than the outer diameter d135 of the collar 135, and the outer diameter d135 of the collar 135 is greater than the outer diameter d100 of the protrusion 100. In a non-limiting example, at least a portion of the bore 120 is provided with female threading that threadingly engages male threading of the fastener 125 to secure the body component 30 to the first member 25. In a non-limiting example, only the portion of the bore 120 extending through the collar 135 is provided with female threading. In another non-limiting example, only the portion of the bore 120 extending through the collar 135 and the flange 85 is provided with female threading. In a non-limiting example, the entire bore 120 is provided with female threading. Accordingly, as best shown in FIG. 3, the first member 25 maintains a gap 147 between the fastener 125 and the wall 148 of the first aperture 105 of the damper housing 25 so that the body component 30 can be secured to the damper housing 15 without the fastener 125 contacting the damper housing 15. In a non-limiting example, the entire bore 120 is smooth and is threaded by the fastener 125 as the fastener 125 is inserted therein.

Figure 8:
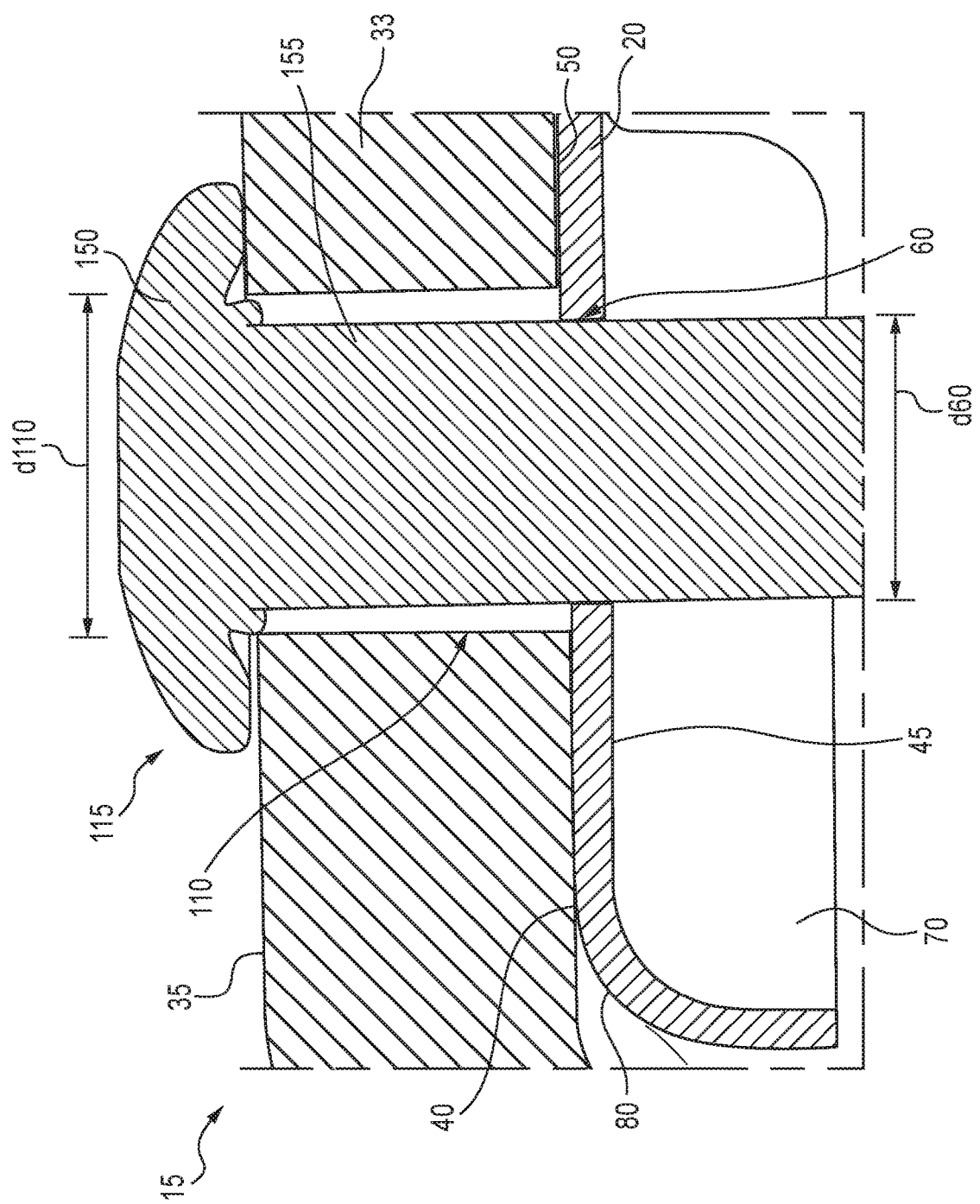
FIG. 8 is a portion of a view of FIG. 3 enlarged for magnification purposes.

In a non-limiting example, the joining assembly 17 may be secured to the damper housing 15 with a fastener 115, such as a rivet with a head 150 and a pin 155, applied from the exterior of the damper housing 15 regardless of whether the joining assembly 17 is positioned on the exterior surface 35 or the interior surface 40 of the outer wall 33 of the damper housing 15. Referring to FIGS. 3 and 8, the joining assembly 17a is positioned with the second side 50 of the body 20 positioned against the interior surface 40 of the damper housing 15. As best shown in FIG. 3, the outer wall 33 of the damper housing 15 may be shaped to define a recess 156 for receiving the body 20. As shown in FIG. 8, the second aperture 60 of the body 20 may have a diameter d60 that is less than the diameter d110 of the second aperture 110 of the damper housing 15. Accordingly, the second aperture 110 of the damper housing 15 provides some accuracy benefit allowing the protrusion 100 to align with the first aperture 105 of the damper housing 15 without impedance, thereby allowing the first member 25 to be accurately positioned for attaching the body component 30 thereto. The fastener 115 can be inserted with the head 150 positioned against the exterior surface 35 of the damper housing 15 and the pin 155 of the fastener 115 extends from the head 150 through the second aperture 110 of the damper housing 15 and the second aperture 60 of the body 20. The pin 155 is deformed to engage the body 20 to secure the joining member 17a to the damper housing 15 with the damper housing 15 positioned between the body component 30a and the body 20. In an illustrative example, the fastener 115 is primarily configured to maintain the position of the joining assembly 17 on the damper housing 15 prior to attachment of the body component 30 to the joining assembly 17. In such an illustrative example, the fastener 125 used to secure the body component 30 to the joining assembly 17 also serves as the primary mechanism for securing the joining assembly 17 to the damper housing 15 by compressing the body 20 and the damper housing 15 between the head of the fastener 125 and the first member 25 during the fastening process.

Figure 9:
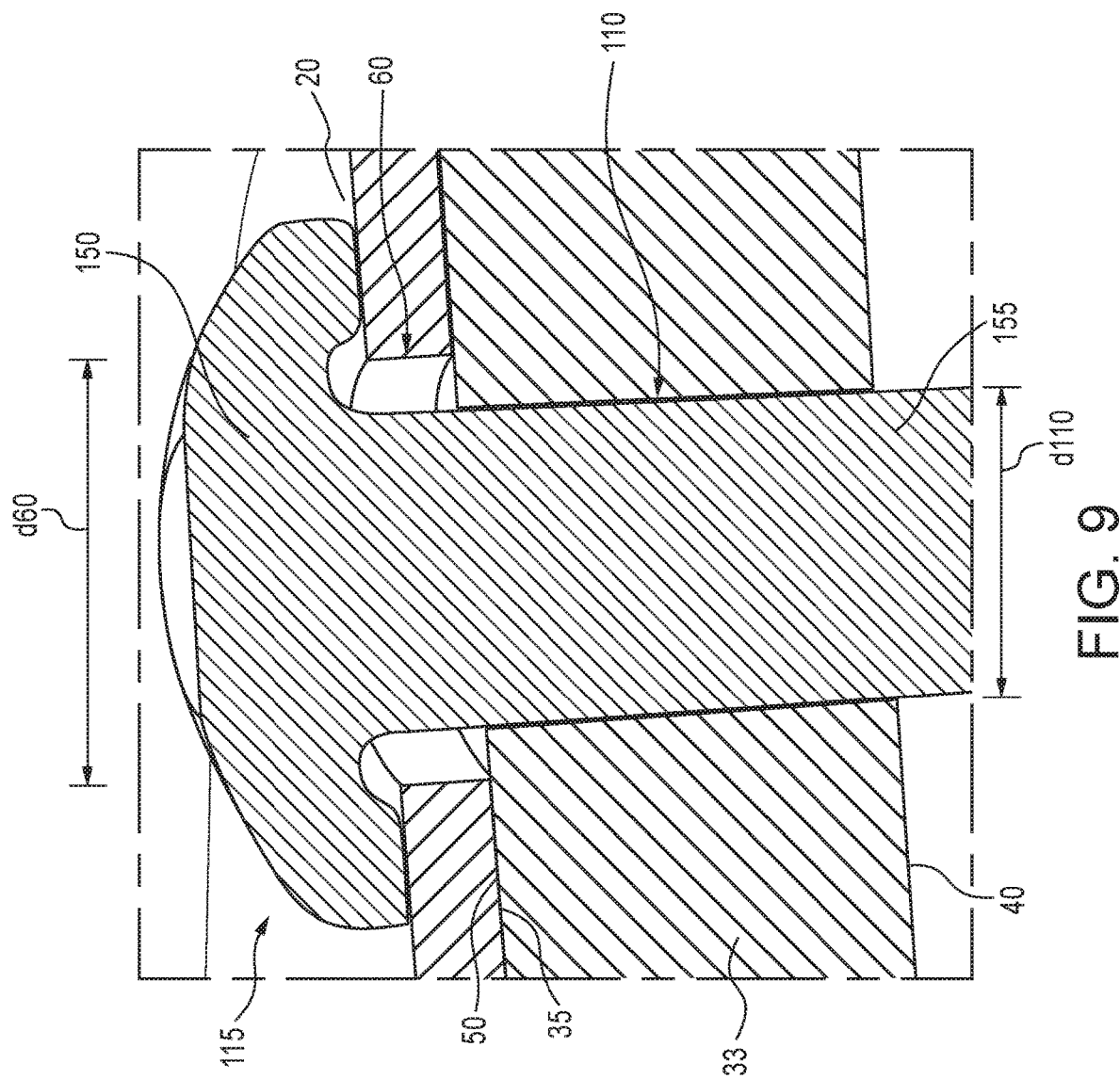
FIG. 9 is a portion of a view of FIG. 6 enlarged for magnification purposes.
Figure 10:
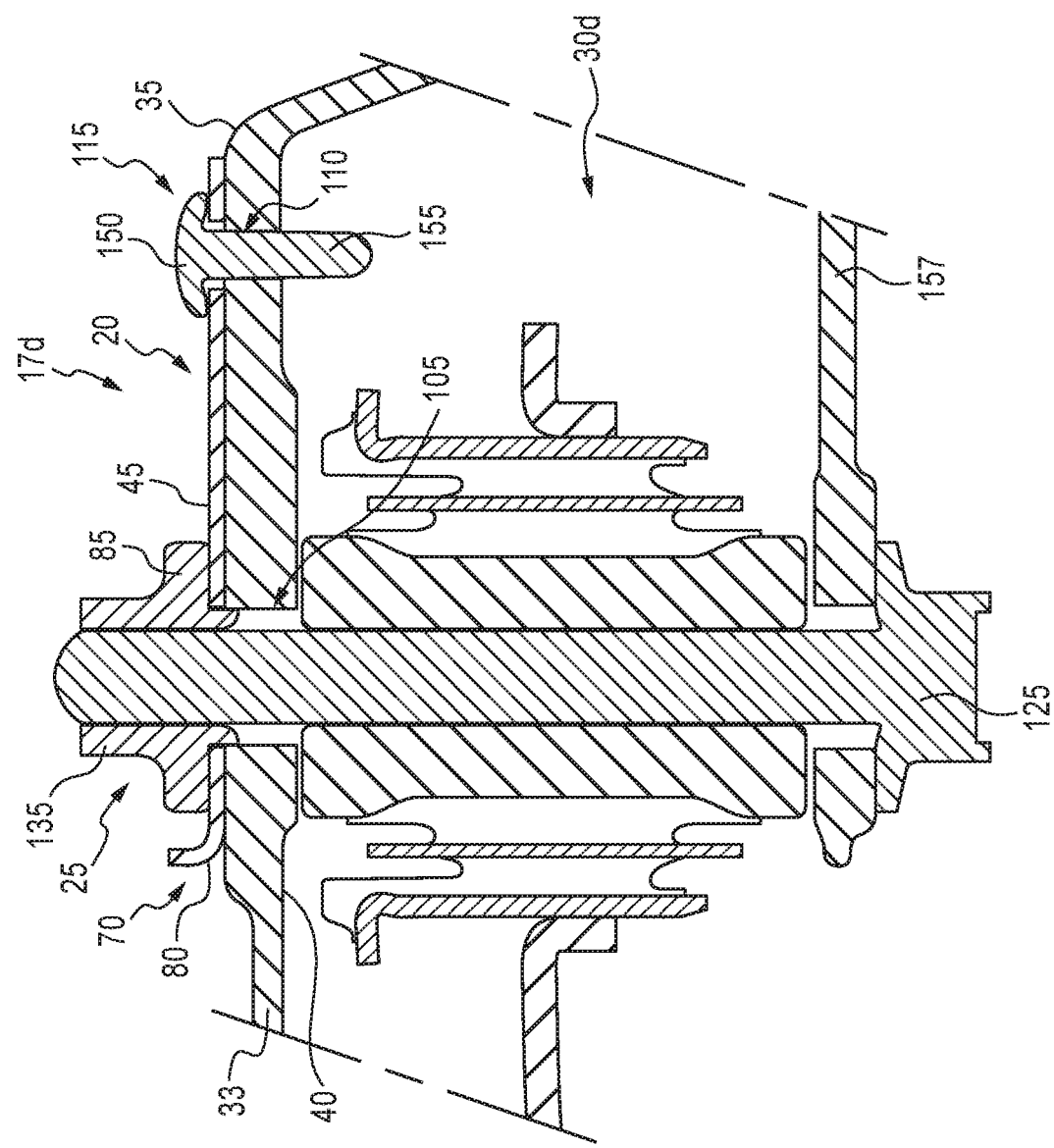
FIG. 10 is a cross-sectional view of a joining assembly positioned outside of a damper housing to secure a body component positioned inside the damper housing according to one aspect of the present disclosure.

Referring to FIGS. 6, 9, and 10, the joining assembly 17d is positioned with the second side 50 of the body 20 positioned against the exterior surface 35 of the damper housing 15. In such a configuration, the body component 30d can be secured to the damper housing 15 inside the chamber 43 between the outer wall 33 and an interior wall 157. As shown in FIG. 9, the second aperture 60 of the body 20 may have a diameter d60 that is greater than the diameter d110 of the second aperture 110 of the damper housing 15. Accordingly, the second aperture 60 of the body 20 provides some accuracy benefit allowing the protrusion 100 to align with the first aperture 105 of the damper housing 15 without impedance, thereby allowing the first member 25 to be accurately positioned for securing the body component 30 thereto. The fastener 115 can be inserted with the head 150 positioned against the first side 45 of the body 20 and the pin 155 of the fastener 115 extending from the head 150 through the second aperture 60 of the body 20 and the second aperture 110 of the damper housing 15. The pin 155 is deformed to engage the damper housing 15 to secure the joining member 17a to the damper housing 15 with the damper housing 15 positioned between the body component 30d and the body 20. In an illustrative example, the fastener 115 is primarily configured to maintain the position of the joining assembly 17 on the damper housing 15 prior to attachment of the body component 30 to the joining assembly 17. In such an illustrative example, the fastener 125 used to secure the body component 30 to the joining assembly 17 also serves as the primary mechanism for securing the joining assembly 17 to the damper housing 15 by compressing the body 20 and the damper housing 15 between the head of the fastener 125 and the first member 25 during the fastening process.

Figure 11:
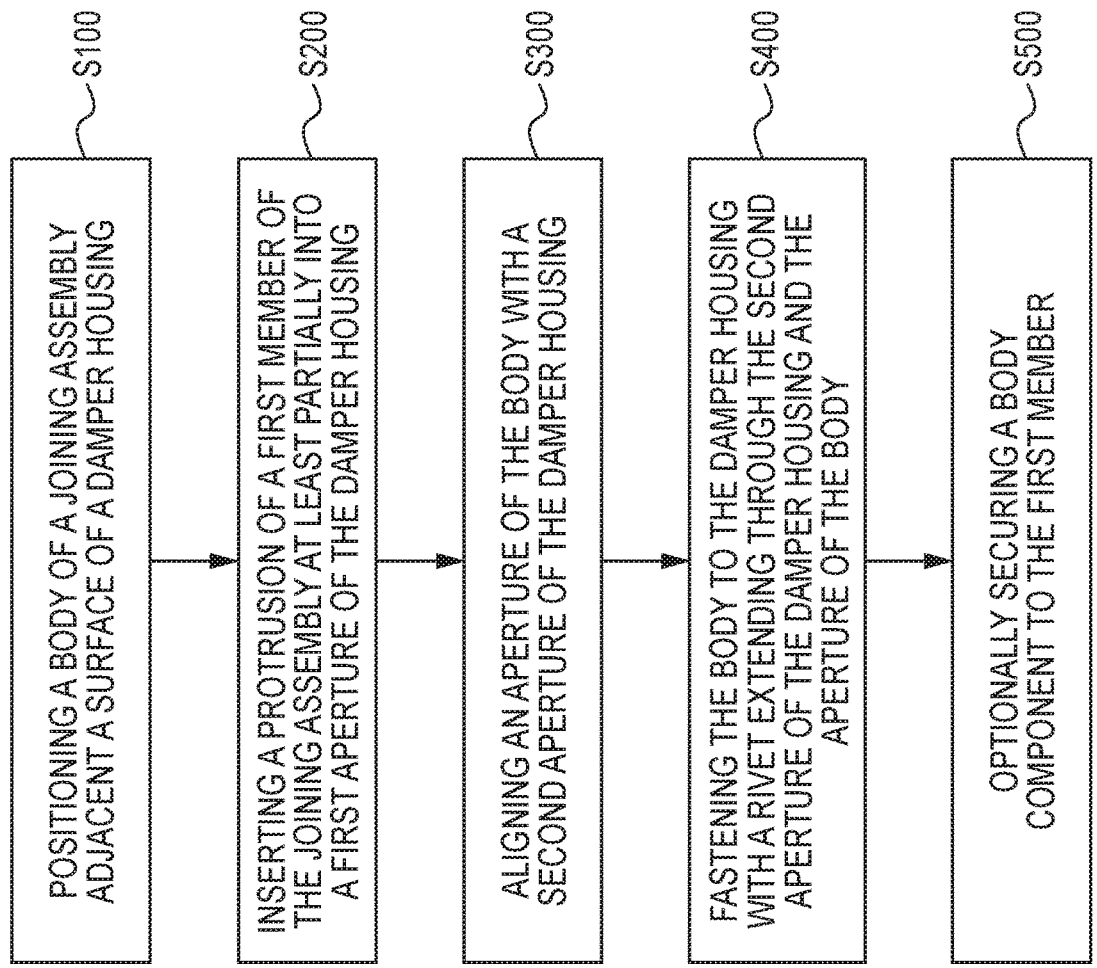
FIG. 11 is a schematic block diagram illustrating an exemplary method of making a damper housing assembly according to one aspect of the present disclosure.

In an embodiment, a method of assembling the damper housing assembly 10 is provided. As shown in FIG. 11, the method includes a step S100 of positioning a body 20 of a joining assembly 17 adjacent a surface of a damper housing 15, a step S200 of inserting a protrusion 100 of a first member 25 of the joining assembly 17 at least partially into a first aperture 55 of the damper housing 15, a step S300 of aligning the (second) aperture 60 of the body 20 with a second aperture 110 of the damper housing 15, a step S400 of fastening the body 20 to the damper housing 15 with a rivet 115 extending through the second aperture 110 of the damper housing 15 and the (second) aperture 60 of the body 20, and optionally a step S500 of securing a body component 30 to the first member 25.

The joining assembly 17 may be provided by stamping a steel sheet to form the steel body 20. The first member 25, which may comprise steel, is welded to the first side 45 of the body 20. For example, the first member 25 includes a plurality of projections 97 extending from the second side 95 of the flange 85, and the plurality of projections 97 are positioned radially outward from the protrusion 100 and contact the first side 45 of the body 20. Welding of the first member 25 to the first side 45 of the body 20 includes inserting the protrusion 100 of the first member 25 through the first aperture 55 of the body 20 to position the projections 97 against the first side 45 of the body 20, and positioning a first welding electrode (not shown) against the first member 25 and a second welding electrode (not shown) against the body 20 to localize the heat in the projections 97 and projection weld the second side 95 of the flange 85 to the first side 45 of the body 20. The joining assembly 17 may be coated before fastening the body 20 to the damper housing 15 with the fastener 115. In a non-limiting example, the joining assembly 17 is coated with an e-coating before being secured to the damper housing 15.

The damper housing 15 is formed by casting a lightweight metal or metal alloy. In a non-limiting example, the damper housing 15 is an aluminum alloy die casting. The first aperture 105 and the second aperture 110 of the damper housing 15 may be entirely formed as part of the casting process and machined to the desired tolerance, or formed following casting by an additional machining step. To the extent the first aperture 105 and the second aperture 110 are machined, the first aperture 105 and the second aperture 110 are provided with a smooth surface that provides a better bonding surface for a protective coating than a threaded surface. In a non-limiting example, the damper housing 15 is coated with an e-coating following formation of the first aperture 105 and the second aperture 110, and before attachment of the joining assembly 17.

To secure the joining assembly 17 to the damper housing 15, the second side 50 of the body 20 is positioned adjacent the exterior surface 35 (as with the joining assembly 17*d* shown in FIG. 12) or the interior surface 40 (as with the joining assembly 17*b* shown in FIGS. 6 and 12) of the damper housing 15 to present the protrusion 100 to the first aperture 105 of the damper housing 15. The second aperture 60 of the body 20 may be simultaneously or subsequently aligned with the second aperture 110 of the damper housing 15. The body 20 is fastened to the damper housing 15 with a rivet 115 extending through the second aperture 110 of the damper housing 15 and the second aperture 60 of the body 20. In a non-limiting example as shown in FIG. 12, the rivet 115 is driven from the exterior of the damper housing 15 so that the head 150 of the rivet 115 is positioned on the exterior surface 35 side of the damper housing 15 regardless of whether the joining assembly 17 is positioned against the exterior surface 35 (as with joining assembly 17*d*) or the interior surface 40 (as with joining assembly 17*b*) of the outer wall 33 of the damper housing 15. In a non-limiting example, the resulting damper housing assembly 10 may be e-coated.

Figure 13A:
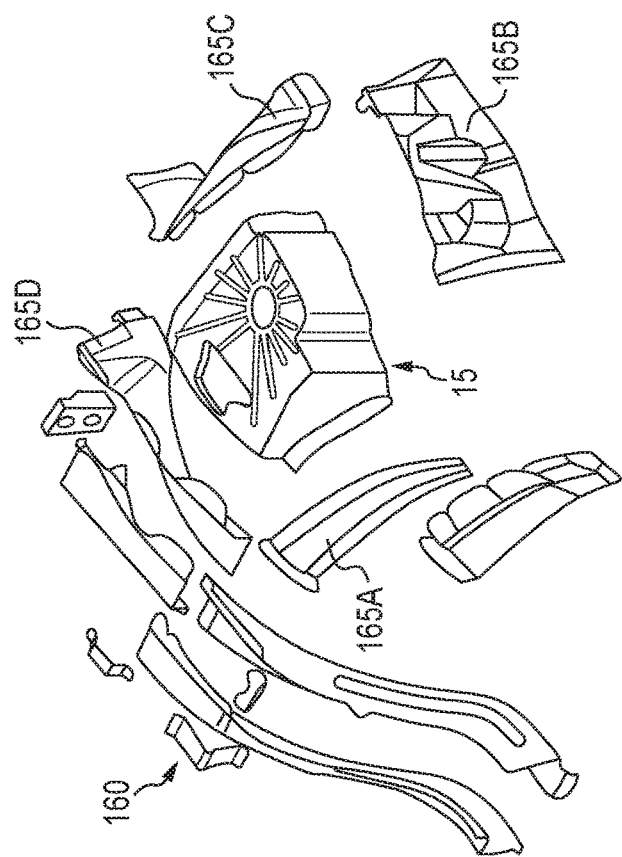
FIG. 13A an exploded view of a damper housing and a side rail of a front body structure according to one aspect of the present disclosure.
Figure 13B:
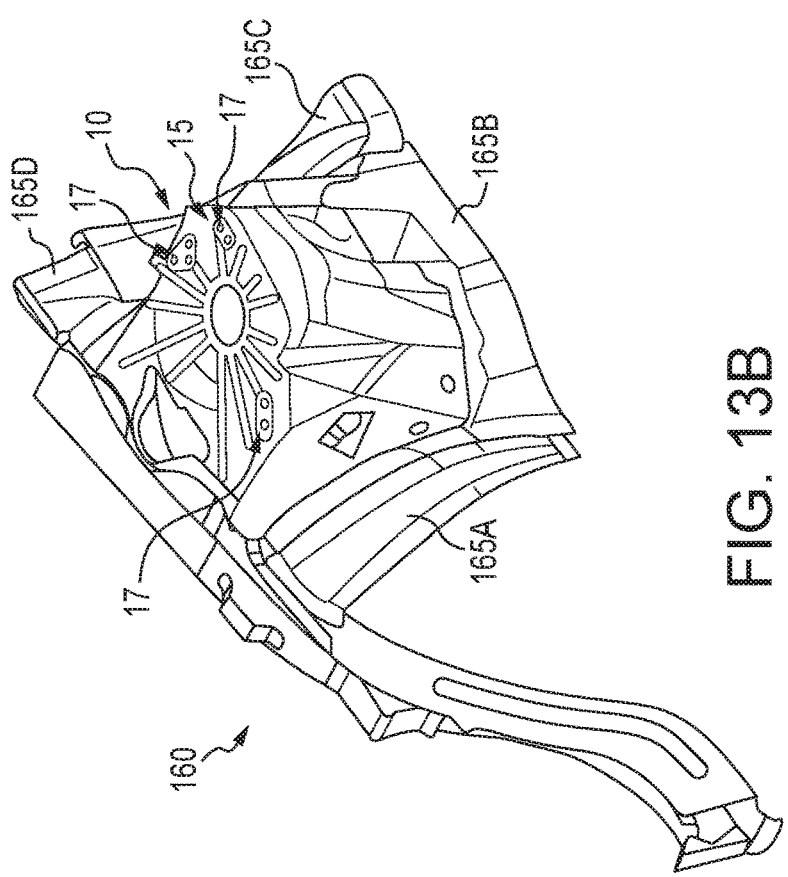
FIG. 13B is a perspective view of a damper housing assembly secured to a side rail of a front body structure according to one aspect of the present disclosure.

In a non-limiting example, the damper housing assembly 10 forms part of a component that is to be secured to a front body structure 160 of a vehicle as shown in FIGS. 13A and 13B. A skirt that comprises a plurality of steel stamped components 165A, 165B, 165C and 165D may be secured to the damper housing 15 before or after the joining assemblies 17 are secured to the damper housing 15. The body component(s) 30 can be secured to the first member(s) 25 following assembly of the front body structure 160.

The component 165D includes a projection extending outward therefrom that is securable to the side rail of the front body structure 160 to mount the damper housing 15 thereto as shown in FIG. 13B. The side rail may be comprised of steel. Therefore, the component 165D can be secured to the side rail by conventional joining methods, such as resistance spot welding. Following the assembly of the damper housing assembly 10 and securing of damper housing assembly 10 the side rail of the front body structure 160, the resulting primary body structure of the vehicle is sent through an e-coating process for additional corrosion protection. The e-coating on the primary body structure is then cured by in an oven heated to about 180° C. or greater. After the e-coating is cured, the body component(s) 30 may be secured to the first member(s) 25 with the fastener(s) 125.

While, for purposes of simplicity of explanation, the methods have steps described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A damper housing assembly comprising:
a damper housing comprising a first material, the damper housing defines a first aperture and a second aperture;
a body comprising a second material that is different than the first material, the body includes a first side and a second side and defines a first aperture extending from the first side to the second side and a second aperture extending from the first side to the second side, the second side of the body is positioned adjacent a surface of the damper housing with the first aperture of the body aligned with the first aperture of the damper housing and the second aperture of the body aligned with the second aperture of the damper housing, wherein the body includes a first end adjacent the first aperture of the body and a second end adjacent the second aperture of the body, and wherein the width of the body between the first aperture of the body and the second aperture of the body, as measured by a line perpendicular to a centerline of the body that extends from the first end to the second end, decreases as the centerline extends from the first aperture to the second aperture;
a first member including a flange and a protrusion, the flange includes a first side and a second side, the second side of the flange is secured to the first side of the body, the body is positioned between the damper housing and the flange, the protrusion extends from the second side of the flange and at least partially into the first aperture of the damper housing, wherein a body component is securable to the first member; and a fastener extending through the second aperture of the body and the second aperture of the damper housing to secure the body to the damper housing.

2. The damper housing assembly of claim 1, wherein the damper housing defines a first aperture, the body includes a first side and a second side and defines a first aperture extending from the first side to the second side, the second side of the body is positioned adjacent a surface of the damper housing with the first aperture of the body aligned with the first aperture of the damper housing, the second side of the flange is secured to the first side of the body and the protrusion extends from the second side of the flange through the first aperture of the body and at least partially into the first aperture of the damper housing.

3. The damper housing assembly of claim 2, wherein the flange has a diameter that is greater than a diameter of the first aperture of the body, and the flange is projection welded to the first side of the body.

4. The damper housing assembly of claim 2, wherein the first member includes a collar extending outward from the first side of the flange and away from the protrusion, wherein the collar extends outward from the first side of the flange a distance that is greater than the distance the protrusion extends outward from the second side of the flange.

5. The damper housing assembly of claim 4, further comprising the body component, wherein the first member defines a bore extending therethrough and the protrusion defines a first opening to the bore and the collar defines a second opening to the bore, the body component includes a fastener that extends into the bore from the first opening to secure the body component to the first member, and the damper housing is positioned between the body component and the body.

6. The damper housing of claim 1, wherein the body is coated with an epoxy-based coating.

7. The damper housing assembly of claim 1, wherein the body has a planar shape and includes a first side and a second side, the second side is positioned adjacent a surface of the damper housing, and at least a portion of a perimeter of the body defines a lip extending outward from the first side of the body away from the adjacent surface of the damper housing.

8. The damper housing assembly of claim 1, wherein the damper housing is comprised of an aluminum alloy casting or a magnesium alloy casting, and the body is comprised of a steel stamping.

9. The damper housing assembly of claim 1, wherein the first member defines a bore, and further comprising the body component secured to the first member with a fastener that is received in the bore, wherein the first member maintains a gap between the fastener and the damper housing.

10. A damper housing assembly comprising:
a damper housing comprising a first material, the damper housing defines a first aperture and a second aperture, wherein the damper housing includes an exterior surface and an interior surface, the interior surface defines a chamber;
a body comprising a second material that is different than the first material, the body includes a first side and a second side and defines a first aperture extending from the first side to the second side and a second aperture extending from the first side to the second side, the second side of the body is positioned adjacent the exterior surface of the damper housing with the first aperture of the body aligned with the first aperture of the damper housing and the second aperture of the body aligned with the second aperture of the damper housing, the second aperture of the body has a diameter that is greater than the diameter of the second aperture of the damper housing;
a first member comprising a flange and a protrusion, the flange includes a first side and a second side, the second side of the flange is secured to the first side of the body, and the protrusion extends from the second side of the flange through the first aperture of the body and at least partially into the first aperture of the damper housing, wherein a body component is securable to the first member; and
a fastener comprising a rivet with a head positioned against the first side of the body and a pin extending from the head through the second aperture of the body and the second aperture of the damper housing to secure the body to the damper housing.

11. The damper housing assembly of claim 10, wherein the body includes a first end adjacent the first aperture of the body and a second end adjacent the second aperture of the body, and wherein the width of the body between the first aperture of the body and the second aperture of the body, as measured by a line perpendicular to a centerline of the body that extends from the first end to the second end, decreases as the centerline extends from the first aperture to the second aperture.

12. The damper housing assembly of claim 10, wherein the body has a planar shape, and at least a portion of a perimeter of the body defines a lip extending outward from the first side of the body away from the adjacent surface of the damper housing, and wherein the flange has a diameter that is greater than a diameter of the first aperture of the body, and the flange is projection welded to the first side of the body.

13. The damper housing assembly of claim 10, wherein the first member includes a collar extending outward from the first side of the flange and away from the protrusion, wherein the collar extends outward from the first side of the flange a distance that is greater than the distance the protrusion extends outward from the second side of the flange, and wherein the protrusion extends only partially through the first aperture of the damper housing.

14. The damper housing assembly of claim 13, further comprising the body component, wherein the first member defines a bore extending therethrough and the protrusion defines a first opening to the bore and the collar defines a second opening to the bore, the body component includes a fastener that extends into the bore from the first opening to secure the body component to the first member.

15. A method of making a damper housing assembly comprising:
providing a damper housing that includes an exterior surface and an interior surface, the interior surface defines a chamber;
positioning a joining assembly adjacent the interior surface of the damper housing, wherein the joining assembly includes a first member secured to a body, the first member includes a protrusion extending therefrom, the body defines a first aperture and a second aperture, and wherein the damper housing defines a first aperture and a second aperture, and the second aperture of the damper housing has a diameter that is greater than the diameter of the second aperture of the body;
inserting the protrusion of the first member at least partially into the first aperture of the damper housing;
aligning the second aperture of the body with the second aperture of the damper housing; and fastening the body to the damper housing with a rivet with a head positioned against the exterior surface of the damper housing and a pin extending from the head through the second aperture of the housing and the second aperture of the body.

16. The method of claim 15, wherein the body of the joining assembly includes a first side and a second side, the body is comprised of a steel, and the second side of the body is positioned adjacent the surface of the damper housing, wherein the first member of the joining assembly includes a flange and a collar, wherein the flange includes a first side and a second side, the second side of the flange is welded to the first side of the body, wherein the protrusion extends from the second side of the flange through the first aperture of the body, and the collar extends from the first side of the flange away from the protrusion, wherein the first member defines a bore extending therethrough and the protrusion defines a first opening to the bore and the collar defines a second opening to the bore, and wherein the damper housing is comprised of an aluminum alloy casting or a magnesium alloy casting.

17. The method of claim 16, further comprises a step of providing the joining assembly, the step comprising:

stamping a steel sheet to form the body;

providing the first member, wherein the first member includes a plurality of projections extending from the second side of the flange, wherein the plurality of projections are positioned on the second side of the flange radially outward of the protrusion;

inserting the protrusion of the first member through the first aperture of the body to position the projections against the first side of the body;

projection welding the first member to the second side of the flange to the first side of the body to form the joining assembly; and coating the joining assembly before fastening the body of the joining assembly to the damper housing with the rivet.

18. The method of claim 16, further comprising securing a body component to the first member with a fastener that extends into the bore through the first opening to secure the body component to the first member with the damper housing positioned between the body component and the body.

* * * * *